United States Patent Office 3,408,791
Patented Nov. 5, 1968

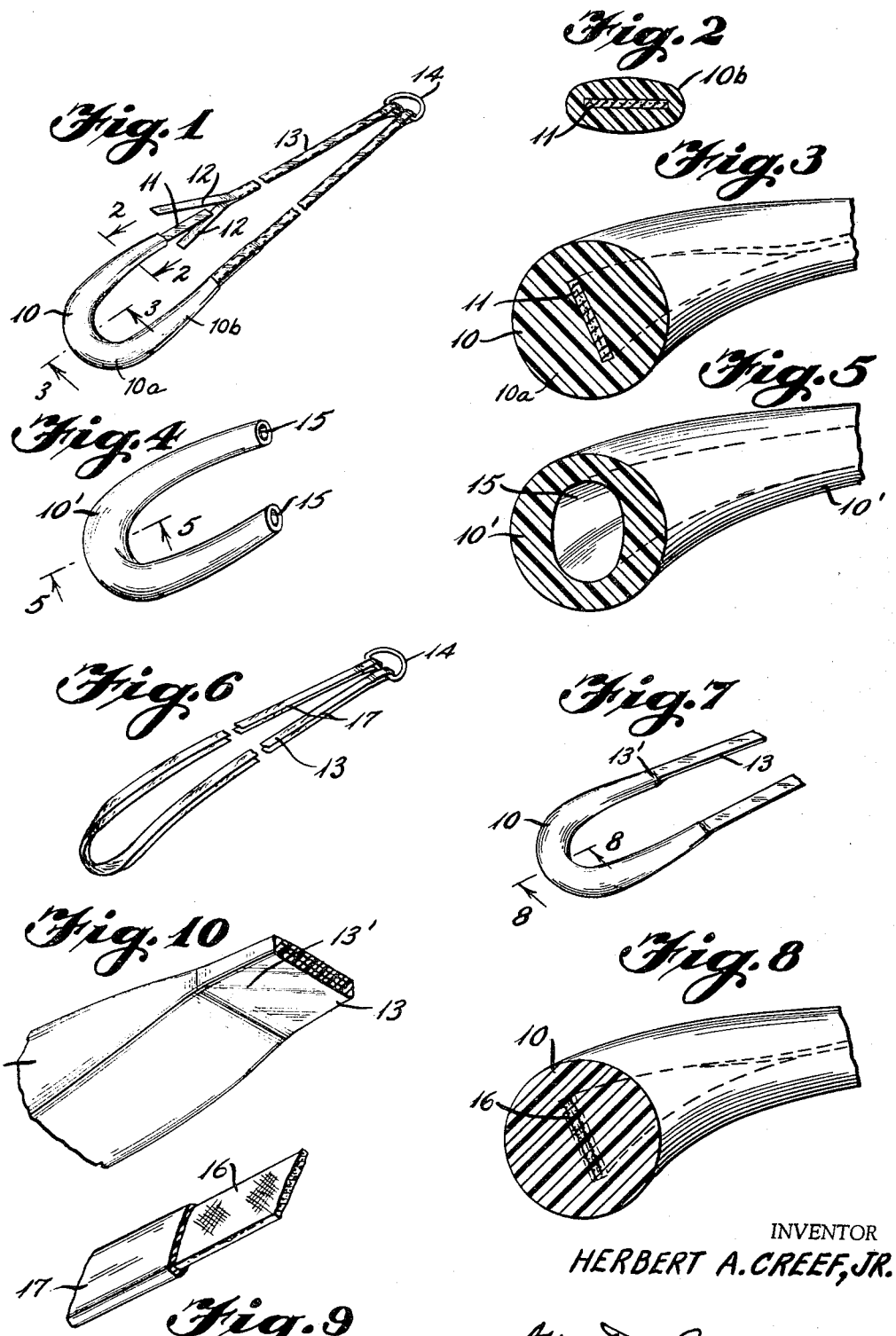

3,408,791
CRUPPER
Herbert A. Creef, Jr., P.O. Box 396,
Manteo, N.C. 27954
Filed June 23, 1966, Ser. No. 559,971
6 Claims. (Cl. 54—22)

ABSTRACT OF THE DISCLOSURE

A crupper member comprising a strap member having an enlarged molded plastic element enclosing a central portion thereof. The plastic element being provided with a circular central section and tapered end portions of oval shape.

---

This invention relates to harness used on horses and particularly those engaged in harness racing.

It is an object of the invention to provide a relatively simple, practical, inexpensive, one-piece, molded crupper resistant to body moisture and heat obviating the necessity for the use of a substance which will exude lubricant as a preservative, as well as for the outer surface to reduce friction, as well as provide a crupper which will be lubricated by the moisture from the animal's body when required.

Other objects and advantages of the invention will be apparent from the following description taken in conjunction with the accompanying drawing in which:

FIG. 1 is a perspective illustrating a crupper and the manner of attaching to a back strap;

FIG. 2, a cross-section on the line 2—2 of FIG. 1;

FIG. 3, a section on the line 3—3 of FIG. 1;

FIG. 4, a modified form having a hollow passage throughout its length;

FIG. 5, a section on the line 5—5 of FIG. 4;

FIG. 6, a perspective of an endless crupper strap looped through a harness ring prior to the molding of the crupper thereon.

FIG. 7, a fragmentary detail after the crupper has been molded on the strap and after the straps have been fused together;

FIG. 8, a section on the line 8—8 of FIG. 7 showing the crupper and straps fused together;

FIG. 9, a fragmentary detail showing the inner web and the impregnated surface coating; and, FIG. 10, an enlarged fragmentary detail illustrating the manner of fusing the straps and the crupper together into one body.

Briefly stated the invention is a crupper with a strap and a harness ring defined in an inexpensive, practical, and durable unitary structure, having the desired characteristics of softness and flexibility in order to be comfortable and not irritate the animal.

With continued reference to the drawing the crupper of the present invention includes a generally U-shaped body 10 with a central strap or web 11 molded within the same and with exposed ends adapted to be fastened or secured to end portions 12 of each of a pair of back straps 13, the opposite ends of each of which are attached to a single harness ring 14. The crupper body 10 is plastic such that body moisture and heat will render it soft, pliable and unabrasive on its exterior for maximum comfort and durability regardless of environmental conditions. Also the crupper of the present invention eliminates parts becoming unfastened and early deterioration for this and other reasons.

Referring to FIGS. 1 to 3, it will be observed that the U-shaped plastic crupper body 10 includes a rounded base portion 10a which forms the base of the U and is of generally circular cross section of a diameter greater than the width of the strap. Base portion 10a of plastic body 10 tapers into flattened leg portions 10b of oval cross section. The major diameter of the oval leg portions 10b is coextensive with the portion of strap 11 embedded therein, and is of greater length than the strap width.

Instead of a crupper of a construction illustrated in FIGS. 1, 2 and 3, a crupper may be provided having a longitudinal passage for the removable reception and consequent ease of replacement of a strap, such crupper 10' being molded of plastic and having a bore 15 adapted to receive a strap of any desired character to complete the unit.

One desirable form of the strap for use with a harness ring is illustrated in FIGS. 6 and 7, such strap being looped through the harness ring and disposed upon itself with the harness at the intermediate portion of the strap, after which the portions extending beyond the harness ring and overlying each other can be fastened together in any desired manner, such as by fusing or the like.

The strap of FIGS. 6 and 7 may have a crupper 10 molded thereon and fused thereto and at the same time the plies of the strap are fused together in a single operation to form an integral unit. In such embodiment the material may have disposed therebetween a thickening layer, the strap of FIGS. 6, 7 and 8 being illustrated in FIG. 9 and including an inner web 16 with an impregnated surface coating 17. When this strap is combined with the crupper and heat is applied, the parts will be united and result in the crupper 10 with the reduced portion 13' merging into the strap 13. In view of the use of a strap it will be flat except that the intermediate portion of the U-shaped body of the crupper will be on edge providing a greater thickness and reinforcement of the crupper.

It will be apparent from the foregoing that a simple, practical, inexpensive, durable, one-piece device is provided resistant to body heat and moisture, obviating the necessity for the use of a susbtance containing lubricant or the like which it would exude as a preservative for leather and other substance, and further the present invention when subjected to heat and moisture will have a lubricated surface so desirable in order to provide a comfortable, non-irritating mechanism.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A crupper comprising a generally U-shaped strap having a width substantially greater than its thickness providing back strap portions lying in substantially the same plane and a curved portion forming a base portion, a molded U-shaped plastic crupper body enclosing the base portion of the U and a portion of the back strap portions, and having a substantially enlarged circular cross section in the base portion region and a generally oval cross section in the back strap region, the major diam- of the oval being coextensive with the strap and extending for a length along the back strap portions, the outer surface of the U-shaped molded plastic body being smooth and gradually tapering from the circular region to the oval region.

2. The structure of claim 1 in which the strap portion passing through the plastic crupper body is bonded thereto.

3. The structure of claim 1, in which back straps extending from the plastic body are of continuous web material looped at its middle, and bent upon itself with the overlapping web material secured together except at its mid portion to form a back strap with a loop at one end, the ends of the web material being bonded to the molded plastic U-shaped body, and a single harness ring mounted in and connecting the loops of the back straps.

4. The structure of claim 3 in which both back straps are made from a single continuous web which passes through the plastic crupper body.

5. The structure of claim 3 in which each back strap is made from a different continuous web and a separate strap is mounted within the molded plastic crupper body and has each of its ends disposed between and secured to the ends of the continuous web forming a back strap.

6. The structure of claim 1 in which the webbing of the back straps is composed of fabric material having its surface impregnated with plastic.

References Cited

UNITED STATES PATENTS

| | | | |
|---|---|---|---|
| 350,216 | 10/1886 | Stanley | 54—22 |
| 494,195 | 3/1893 | Fitzgerald | 54—22 |
| 960,375 | 6/1910 | Mudd | 54—87 |
| 3,270,488 | 9/1966 | Beach | 54—2 X |
| 3,302,371 | 2/1967 | Beach | 54—22 |

HUGH R. CHAMBLEE, *Primary Examiner.*